UNITED STATES PATENT OFFICE.

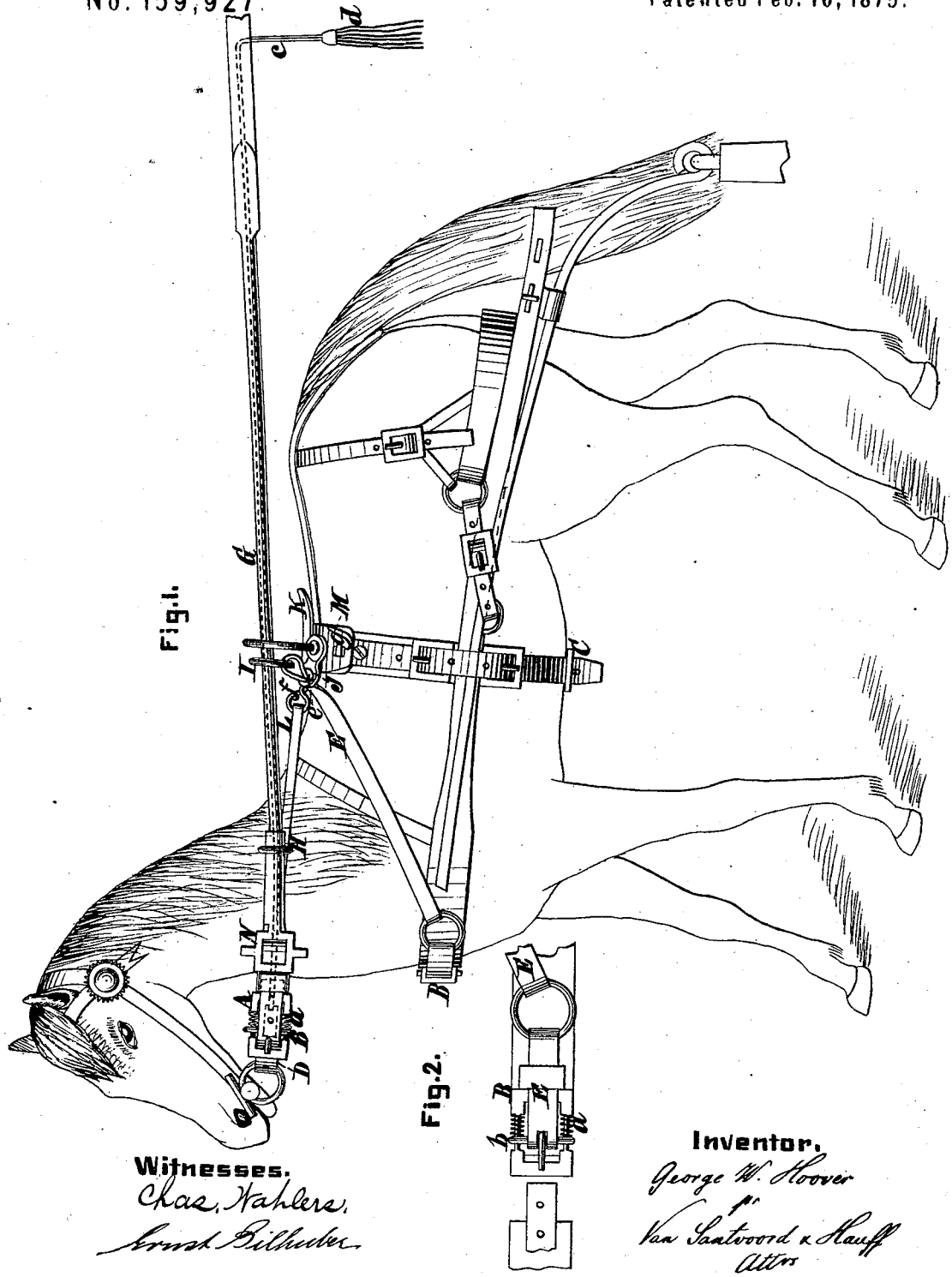

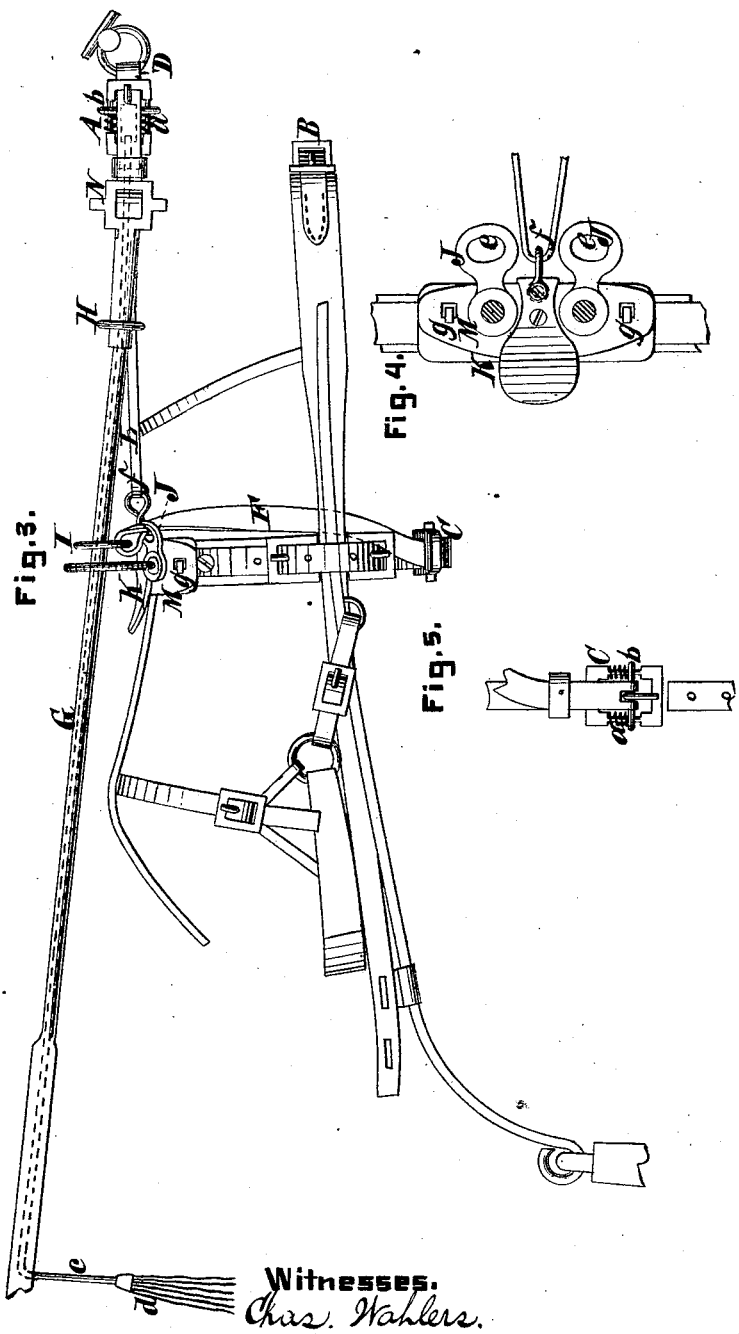

GEORGE W. HOOVER, OF KUTZTOWN, PENNSYLVANIA.

IMPROVEMENT IN HARNESS.

Specification forming part of Letters Patent No. 159,927, dated February 16, 1875; application filed January 29, 1875.

*To all whom it may concern:*

Be it known that I, GEORGE W. HOOVER, of Kutztown, in the county of Berks and State of Pennsylvania, have invented a certain new and useful Improvement in Harness, of which the following is a specification:

This invention is illustrated in the accompanying drawing, in which—

Figure 1 represents my harness affixed to a horse. Fig. 2 is a view of the breast-strap buckle and its connections. Fig. 3 represents my harness from the side opposite to that of Fig. 1. Fig. 4 is a plan view of the saddle detached. Fig. 5 represents the girt-buckle. Fig. 6 is a sectional view of one of the lines.

Similar letters indicate corresponding parts.

The invention relates to an arrangement for instantaneously unhitching the harness from a horse or other animal, especially when the animal passes from under the control of the driver, as well as under ordinary circumstances. My invention consists in a peculiar combination of what I denominate a "spring-buckle" with the lines, breast-strap, and girt of the harness, together with a cord running through the lines, and with unhitching-straps connecting the lines to the buckles in such a manner that by drawing the cords and the lines the harness can be completely detached from the animal, as hereinafter more fully described. It consists, also, in a peculiar construction of the saddle, which has a top or loose part for retaining the check-rein, and which is connected with the lines in such a manner that the rein becomes detached with the remaining portions of the harness.

In the drawing, the letters A B C designate a series of buckles affixed to my harness, as hereinafter described, and with the tongues of which are combined springs *a*, which have a tendency to retain them in a forward position. The springs *a* are coiled on the opposite longitudinal rims of the buckles A B C, and bear against a cross-bar, *b*, which slides upon the said rims, and to which the tongues are hinged. The spring-buckles thus formed are affixed to such portions of my harness as are essential to be unhitched in order to completely detach the harness from the animal. The unhitching of the buckles is effected by means of straps D E F, fastened to the harness, and which pass over or around the cross-bar *b* of the respective buckles in such a manner that when the straps are drawn back the tongues of the buckles are drawn with them against the action of the springs *a*, and the part with which the tongue may be engaged is released.

In the present example the spring-buckles A B C are affixed to and constitute the connection of the lines, breast or draft strap, and girt of the harness, as I will now proceed to describe in detail.

The letters G G designate the two lines of my harness, which are connected to the bit-rings by means of the spring-buckles A A. To the straps D of the buckles A are connected, respectively, cords *c*, (best seen in Fig. 6,) which run through the interior of the lines and emerge near their rear ends, or at that part which is held by the driver. To the end of the cords is attached a tassel, *d*, or any other appendage whereby the cords can be conveniently grasped by the hand, and are kept from disappearing in the lines. By taking hold of the tassels, and thereby drawing the cords *c*, the movement thereof is communicated to the tongue of the buckles A, and by this means the lines are unhitched from the bit-ring. The cords *c* are preferably made of cat-gut, or of some other material that will to the greatest extent resist wear. At a point between the bit and terrets the lines G G are provided with a flange, H, while in the rear of this flange the lines pass through rings I, secured to the ends of the unhitching-straps E F of the breast-buckle B and girt-buckle C. The last-named straps E F are located upon opposite sides of the harness, (see Figs. 1 and 3,) and are guided in holes *e* of plates J, secured to the saddle K, and in such other or additional manner as the nature of the harness may allow. If the lines G G are drawn back after they are released from the bit-ring their flange H catches the rings I of the straps E F, and draws them with it, and by this means the breast-strap and girt-buckles B C are opened, and these parts become unhitched. It now remains to unhitch the check-rein L, (when a rein is used,) in order to detach the entire harness, and to this end the rein is confined between the body of the saddle K and a top or loose part thereof by means of a loop, *f*, so that when this top part M is displaced the rein will become unhitched. The loose part M carries the terrets of the saddle, and is composed of a plate of spring-steel or other metal, which is held to the saddle by means of hooks or lugs *g*, or by any other means that will allow of its displacement by a backward pull of the terrets. The part M of the saddle is pulled back by ornamental projections N of the lines, which, when the lines are drawn back, strike against the terrets and raise or displace the plate, and by this means the rein is released. When the harness is thus unhitched it, together with the shafts of the vehicle, can be lifted from its place on the animal and the animal allowed to escape, whereby, if the latter is unruly and has passed from under the control of the driver, all danger to the vehicle or its occupants is averted.

It is obvious that my invention is capable of modification, as, for instance, hames may be used in lieu of the breast-strap, which hames is provided with my spring-buckle and with an unhitching-strap in like manner as the breast-strap; and the check-rein L may be entirely dispensed with, or various parts may be added to the harness. Furthermore, the cords *c* may be connected directly to the tongues of the spring-buckles A, instead of by the interposition of the strap D.

My invention is applicable to a double as well as to a single harness.

What I claim as new, and desire to secure by Letters Patent, is—

1. The spring-buckles A A, in combination with the lines G G and cords *c c*, substantially as described.

2. The combination, with the lines G G, of the spring-buckles A A, cords *c c*, and buckle-straps D D, substantially as described.

3. The unhitching-strap E and spring-buckle B of the draft-strap, in combination with the lines G G, substantially as described.

4. In combination with the lines G G, the unhitching-strap F and spring-buckle C of the girt, substantially as described.

5. The combination, with the lines G G and unhitching-straps E F, of the flanges H and rings I, substantially as described.

6. In combination with the spring-buckles A, lines G G, and check-rein L, a saddle having the top part arranged to be displaced by the lines, substantially as described.

In testimony that I claim the foregoing I have hereunto set my hand and seal this 21st day of January, 1875.

GEORGE W. HOOVER. [L. S.]

Witnesses:
    JNO. HUMBERT,
    C. GEHRING.